US005227900A

United States Patent [19]

Inaba et al.

[11] Patent Number: 5,227,900

[45] Date of Patent: Jul. 13, 1993

[54] METHOD OF DRIVING FERROELECTRIC LIQUID CRYSTAL ELEMENT

[75] Inventors: Yutaka Inaba, Kawaguchi; Katsumi Kurematsu, Kawasaki; Shuzo Kaneko, Yokohama, all of Japan

[73] Assignee: Canon Kabushiki Kaisha, Tokyo, Japan

[21] Appl. No.: 671,449

[22] Filed: Mar. 19, 1991

[30] Foreign Application Priority Data

Mar. 20, 1990 [JP] Japan ................................ 2-70511

[51] Int. Cl.[5] ........................ G02F 1/133; G09G 3/36

[52] U.S. Cl. ........................................ 359/56; 359/57; 359/85; 340/784

[58] Field of Search ...................... 359/56, 57, 85, 100; 340/784, 805, 811

[56] References Cited

U.S. PATENT DOCUMENTS

| | | | |
|---|---|---|---|
| 4,367,924 | 1/1983 | Clark et al. | 350/334 |
| 4,508,429 | 4/1985 | Nagae et al. | 359/56 |
| 4,725,129 | 2/1988 | Kondo et al. | 359/56 |
| 4,765,720 | 8/1988 | Toyono et al. | 359/56 |
| 4,770,502 | 9/1988 | Kitazima et al. | 359/56 |
| 4,795,239 | 1/1989 | Yamashita et al. | 359/57 |
| 4,818,077 | 4/1989 | Ohwada et al. | 359/56 |
| 4,836,656 | 6/1989 | Mouri et al. | 350/350 S |
| 4,976,515 | 12/1990 | Hartmann | 359/56 |
| 5,058,994 | 10/1991 | Mihara et al. | 359/56 |

FOREIGN PATENT DOCUMENTS

| | | |
|---|---|---|
| 0197742 | 10/1986 | European Pat. Off. . |
| 0284134 | 9/1988 | European Pat. Off. . |
| 0362939 | 4/1990 | European Pat. Off. . |

OTHER PUBLICATIONS

Meyer et al., "Le Journal de Physique Letters", vol. 36, pp. 69-71 (1975).

Clark et al., "Applied Physics Letters", vol. 36, No. 11, pp. 899-901 (1980).

"Liquid Crystals: Solid State Physics", vol. 16, No. 3, pp. 141-151 (1981).

*Primary Examiner*—William L. Sikes

*Assistant Examiner*—Tai V. Duong

*Attorney, Agent, or Firm*—Fitzpatrick, Cella, Harper & Scinto

[57] ABSTRACT

A method of driving a liquid crystal display element in which a switching element is provided for each of pixel electrodes arranged in a matrix manner and a ferroelectric liquid crystal is sandwiched between the pixel electrodes and a counter electrode includes the steps of applying a reset voltage for resetting the entire pixel to a first stable state of the ferroelectric liquid crystal across the pixel electrode and the counter electrode, partially transiting the pixel to a second stable state by a tone signal voltage having a pole opposite to that of the reset voltage, and reversing the pole of the reset voltage every predetermined period. Assuming that a state reverse ratio of the ferroelectric liquid crystal is T(V)% when the tone signal voltage is V, a tone signal voltage $V_1$ after negative resetting and a corresponding tone signal voltage $-V_2$ after positive resetting satisfy the following relation:

$$T(V_1)+T(V_2)=100$$

8 Claims, 7 Drawing Sheets

METHOD OF DRIVING FERROELECTRIC LIQUID CRYSTAL ELEMENT

BACKGROUND OF THE INVENTION

1. Field of the Invention

The present invention relates to a method of driving a liquid crystal element mounted on a display device or the like and, more particularly, to a method of driving a ferroelectric liquid crystal element.

2. Related Background Art

An electrooptical element using a ferroelectric liquid crystal (to be referred to as an FLC) has been applied to mainly a simple matrix display element because it responds to an electric field at a high speed and exhibits bistability. In recent years, however, the study of an application of the FLC element to an active matrix display element has begun. One characteristic feature of the active matrix FLC element is that a scanning time (frame period) of one frame can be determined regardless of the response speed of the FLC. In the simple matrix FLC, since the liquid crystal must respond within a selection time for one scanning line, a frame period cannot be decreased to be less than (the response speed of the liquid crystal)×(the number of scanning lines). Therefore, as the number of scanning lines is increased, the frame period is undesirably prolonged. In contrast to this, in the active matrix FLC, only charging/discharging of pixels on one scanning line need be performed within a selection time of the scanning line, and a switching element of the pixels is turned off to hold an application voltage to the liquid crystal after the selection time. Therefore, the liquid crystal responds within this holding time. For this reason, since the frame period is independent from the response speed of the liquid crystal, the active matrix FLC can operate at a speed of 33 ms that is used in normal television sets even if the number of scanning lines is increased.

The second characteristic feature of the active matrix FLC is easiness in tone display. One tone display method of the active matrix FLC is described in EP 284,134, and the principle of the method is that pixels are reset in one stable state beforehand and a charge amount Q is applied to a pixel electrode through an active element, thereby partially causing switching to the second stable state in one pixel. When this principle is used, assuming that an area in which the switching to the second stable state is caused is a and the magnitude of spontaneous polarization of the FLC is $P_S$, an electric charge of $2P_S \cdot a$ is moved upon switching, and the switching to the second stable state continues until this electric charge cancels the electric charge Q applied first. Finally, an area of $$a = Q\sqrt{2P_S}$$

is set in the second stable state. The control of a, i.e., an area tone is realized by changing Q.

According to the experiments conducted by the present inventors, however, the above area tone method using the charge modulation has one drawback in that transition from the first to second stable state does not progress but stops until the electric charges completely cancel each other as described above. This state is shown in FIGS. 4A and 4B. FIGS. 4A and 4B plot changes over time in inter-pixel electrode voltage (FIG. 4A) and transmitted light intensity (FIG. 4B) obtained when the reset and the tone display are repeated at a period of 33 ms as in a normal television set. The voltage is abruptly attenuated immediately after the active element is turned off, but then the attenuation becomes very moderate. Similarly, although the transmitted light intensity is abruptly changed immediately after the active element is turned off, the change gradually becomes moderate. That is, although an electric field is present between the electrodes, the reversal between the two states progresses only very slowly or stops.

Because of this phenomenon, a residual DC electric field is continuously applied on the liquid crystal to lead to degradation in the liquid crystal material. Alternatively, as shown in FIG. 5, in a liquid crystal element in which an insulating layer is formed between an electrode and a liquid crystal, impurity ions in the liquid crystal are adhered on the interface of the insulating layer by a DC electric field to generate an electric field in a direction opposite to the DC electric field, thereby degrading the bistability of the FLC.

FIG. 5 is a sectional view showing a practical example of a ferroelectric liquid crystal cell using a TFT to be used in the present invention.

Referring to FIG. 5, a semiconductor film 26 (e.g., amorphous silicon doped with hydrogen atoms) is formed on a substrate 30*a* (e.g, glass or plastic material) via a gate electrode 34 and an insulating film 32 (e.g., a silicon nitride film doped with hydrogen atoms), and a TFT constituted by two terminals 18 and 21 in contact with the semiconductor film 26 and a pixel electrode 22 (e.g., ITO: Indium Tin Oxide) connected to the terminal 21 of the TFT are also formed on the substrate 30*a*.

In addition, an insulating layer 23*b* (e.g., polyimide, polyamide, polyvinylalcohol, polyparaxylylene, SiO, or $SiO_2$) and a light-shielding film 19 consisting of aluminum or chromium are formed on the substrate 30*a*. A counter electrode 31 (ITO: Indium Tin Oxide) and an insulating film 32 are formed on a substrate 30*b* as a counter substrate.

A ferroelectric liquid crystal 33 is sandwiched between the substrates 30*a* and 30*b*. A sealing member 35 for sealing the ferroelectric liquid crystal 33 is formed around the substrates 30*a* and 30*b*.

Polarizers 29*a* and 29*b* in a state of crossed Nicols are arranged at two sides of the liquid crystal element having the above cell structure, and a reflecting plate 28 (a diffusion-reflecting aluminum sheet or plate) is located behind the polarizer 29*b* so that an observer A can observe a display state by reflected light $I_1$ of incident light $I_0$.

In FIG. 5, source and drain electrodes respectively corresponding to the terminals 18 and 21 of the TFT are named assuming that a current flows from the drain to the source. In an operation as an FET, the source can serve as the drain.

SUMMARY OF THE INVENTION

It is an object of the present invention to provide a method of driving a ferroelectric liquid crystal element, which does not degrade the liquid crystal nor reduce the bistability of the FLC.

To achieve the above object of the present invention, a method of driving an electrooptical element using an FLC according to the present invention is characterized by reversing the pole of a reset voltage and that of a tone signal voltage every predetermined period and performing driving such that a tone signal voltage $V_1$ after a negative pole is reset and a tone signal voltage $-V_2$ after a positive pole is reset satisfy $T(V_1)+T(V_2)=100$ assuming that a state reverse ratio of a ferroelectric liquid crystal obtained when the tone signal voltage is V is T(V)%.

According to the present invention, since the pole of the reset voltage and that of the tone signal voltage are reversed every predetermined period, a phenomenon in that a DC electric field is continuously applied on a liquid crystal can be prevented.

Therefore, degradation in liquid crystal material and reduction in bistability of the FLC can be prevented.

DETAILED DESCRIPTION OF THE PREFERRED EMBODIMENTS

An example of a ferroelectric liquid crystal used in a method of driving a ferroelectric liquid crystal element according the present invention is a substance which takes one of first and second optically stable states in accordance with an applied electric field, i.e., has a bistable state with respect to an electric field, in particular, a liquid crystal having such properties.

A most preferable example of the ferroelectric liquid crystal having the bistability and usable in the driving method of the present invention is a ferroelectric chiral smectic liquid crystal such as a liquid crystal having a chiral smectic C phase (SmC*), H phase (SmH*), I phase (SmI*), J phase (SmJ*), K phase (SmK*), G phase (SmG*), or F phase (SmF*). Such a ferroelectric liquid crystal is described in, e.g., "Ferroelectric Liquid Crystals", LE JOURNAL DE PHYSIQUE LETTERS, 36 (L-69), 1975; "Submicro Second Bistable Electrooptic Switching in Liquid Crystals", Applied Physics Letters, 36 (11), 1980; or "Liquid Crystals", Solid-State Physics, 16 (141), 1981. In the present invention, the ferroelectric liquid crystals described in these references can be used.

More specifically, examples of the ferroelectric liquid crystal compound usable in the method of the present invention are decyloxybenzylidene-p'-amino-2-methylbutylcinnamate (DOBAMBC), hexyloxybenzylidene-p'-amino-2-chloropropylcinnamate (HOBACPC), and 4-o-(2-methyl)-butylresorcylidene-4'-octylaniline (MBRA8).

When an element is to be formed by using these materials, to hold a temperature state which allows the liquid crystal compound to have the SmC* or SmH* phase, the element can be supported by a copper block or the like in which a heater is buried.

Figure 9:
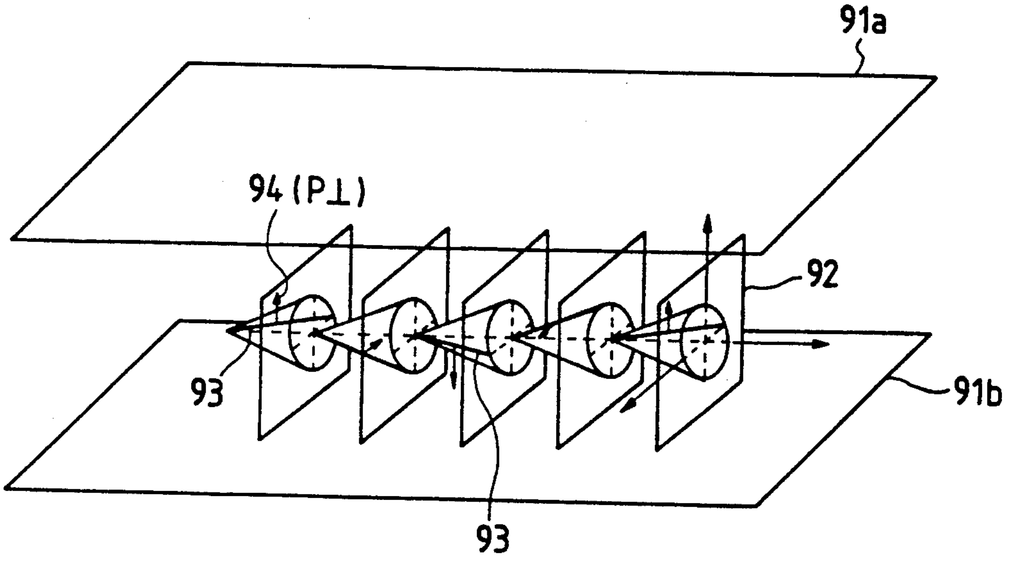
FIG. 9 is a perspective view showing an arrangement of a ferroelectric liquid crystal cell as a model.
Figure 10:
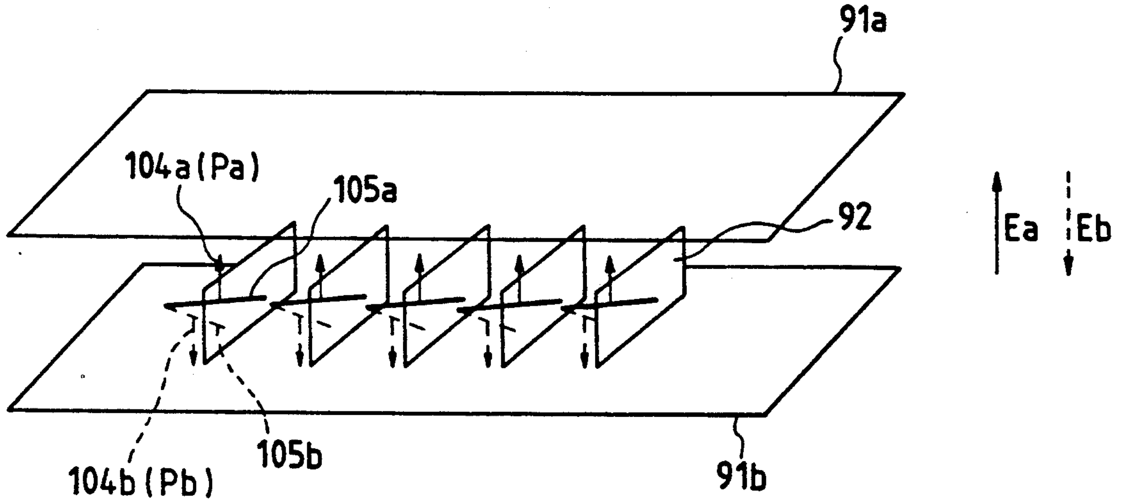
FIG. 10 is a perspective view showing an arrangement of a ferroelectric liquid crystal cell as a model in which ferroelectric liquid crystal molecules form a non-spiral structure.

FIG. 9 is a view showing an arrangement of a ferroelectric liquid crystal cell as a model. Each of substrates (glass plates) 91*a* and 91*b* is coated with a transparent electrode consisting of $In_2O_3$, $SnO_2$, or ITO (Indium-Tin Oxide), and an SmC*-phase liquid crystal in which a liquid crystal molecular layer 92 is oriented perpendicularly to the glass surface is sealed between the substrates. Each liquid crystal molecule 93 indicated by a thick line has a dipole moment (P⊥) 94 perpendicular to the molecule. When a voltage having a predetermined threshold value or more is applied across the electrodes on the substrates 91*a* and 91*b*, since a spiral structure of each liquid crystal molecule 93 is untied, the orientation directions of the liquid crystal molecules 93 can be changed such that all of the dipole moments (P⊥) 94 are directed in the direction of the electric field. The liquid crystal molecule 93 has an elongated shape and exhibits refractive index anisotropy between its major and minor axis directions. Therefore, if polarizers having a positional relationship of crossed Nicols are arranged above and below the glass surface, a liquid crystal optical modulating element which changes its optical characteristics in accordance with a voltage application pole is obtained. When the thickness of the liquid crystal cell is satisfactorily small (e.g., 1 μm), the spiral structure of the liquid crystal molecule is untied (non-spiral structure) even when no electric field is applied, and a dipole moment Pa or Pb of the molecule is directed upward (104*a*) or downward (104*b*), as shown in FIG. 10. When one of electric fields Ea and Eb having different poles of a predetermined threshold value or more is applied to the cell for a predetermine time period as shown in FIG. 10, the dipole moment changes its direction to the upward direction 104*a* or the downward direction 104*b* in correspondence with the electric field vector of the electric field Ea or Eb, and the liquid crystal molecules are oriented in either a first or second stable state 105*a* or 105*b* accordingly.

The use of such a ferroelectric liquid crystal as an optical modulating element provides two advantages. First, a response speed is very high, and second, the orientation of a liquid crystal molecule has a bistable state. The second advantage will be described below by taking the structure shown in FIG. 10 as an example. When the electric field Ea is applied, the liquid crystal molecules are oriented in the first stable state 105*a*, and this state is stable even after the electric field is turned off. When the electric field Eb in the opposite direction is applied, the liquid crystal molecules are oriented in the second stable state 105*b*, i.e., change their directions and remain in this state even after the electric field is turned off. The liquid crystal molecules are kept in either orientation state unless the applied electric field Ea or Eb exceeds the threshold value. To effectively realize these high response speed and bistability, the thickness of the cell is preferably as small as possible. In general, the thickness is preferably 0.5 to 20 μm, and most preferably, 1 to 5 μm. A liquid crystal-electrooptical device having a matrix electrode structure using a ferroelectric liquid crystal of this type is proposed in, e.g., U.S. Pat. No. 4,367,924 to Clark and Ragaval.

The present invention is based on the fact that in an element which has an FET (Field-Effect transistor) such as a TFT (Thin Film Transistor) and constitutes an active matrix, the functions of the drain and source can be switched by reversing an application voltage to the drain and source. An element constituting the active matrix may be either an amorphous silicon TFT or a polycrystalline silicon TFT as long as the element has the FET structure. Alternatively, a bipolar transistor having a structure except for the FET structure can be similarly used. In addition, a two-terminal switching element such as an MIM element or a diode can be used.

Assuming that a drain voltage is $V_D$, a gate voltage is $V_G$, a source voltage is $V_S$, and a gate-to-source threshold voltage is $V_P$, $V_D>V_S$ in an n-type FET, and the FET is rendered conductive when $V_G>V_S+V_P$ and non-conductive when $V_G<V_S+V_P$.

A p-type FET, on the other hand, is rendered conductive when $V_G<V_S+V_P$ and non-conductive when $V_G>V_S+V_P$ for $V_D<V_S$.

Regardless of whether an FET is of a p or n type, a terminal serving as a drain and that serving as a source are determined by the application direction of a voltage. That is, a terminal at a lower voltage serves as a source in an n-type FET whereas that at a higher voltage serves as a source in a p-type FET.

In the ferroelectric liquid crystal, of positive and negative voltages to be applied to a liquid crystal cell, one to be set as a "bright" state and the other to be set as a "dark" state are freely set in accordance with the directions of polarization axes of a pair of polarizers arranged above and below the cell with a relationship of crossed Nicols therebetween and the direction of the major axis or a liquid crystal molecule.

In the present invention, an electric field to be applied to the liquid crystal cell is controlled by controlling an interterminal voltage of each element of the active matrix, thereby obtaining a display. Therefore, a voltage level of each signal need not be limited to those of the following embodiments, but the present invention can be carried out by maintaining relative potential differences between the signals.

Driving actually executed according to the present invention will be described below with reference to the accompanying drawings.

Embodiment 1

Figure 1:
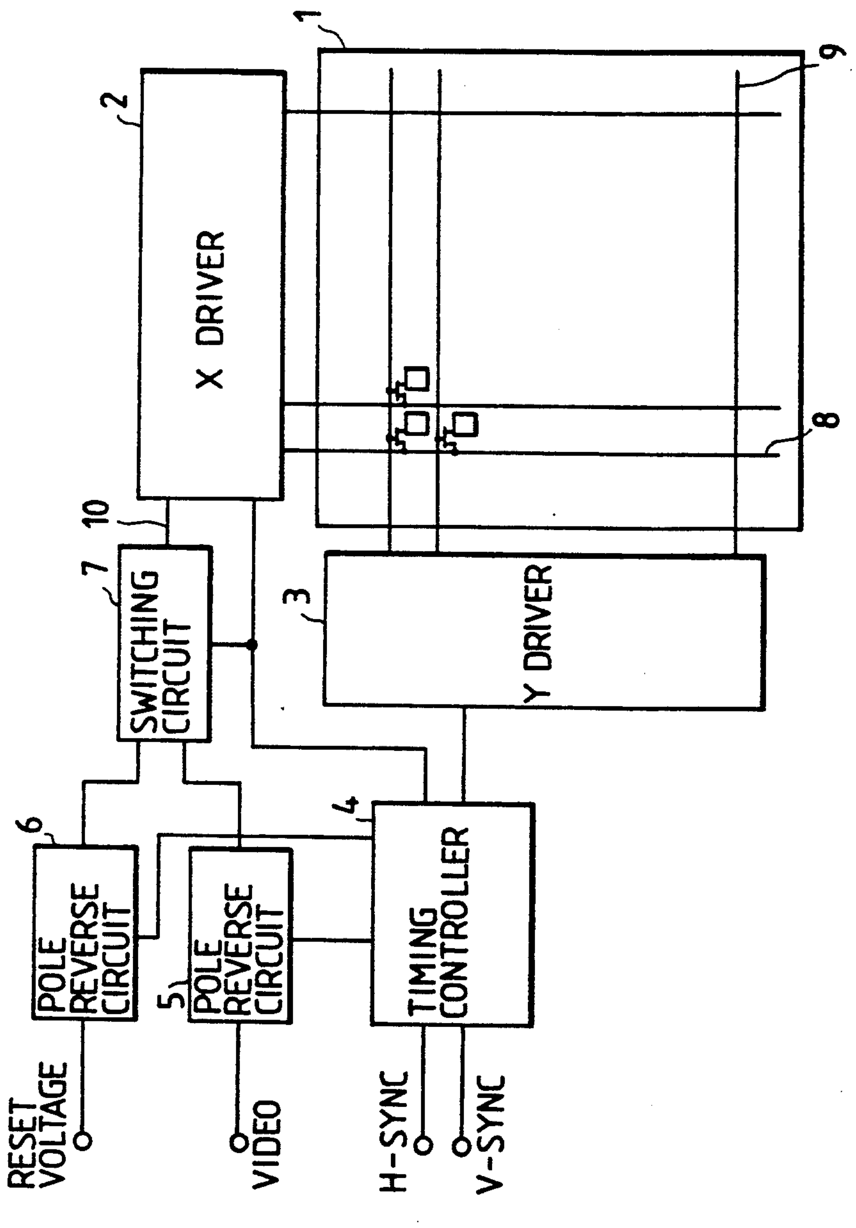
FIG. 1 is a block diagram showing an FLC panel and a driving system according to the present invention.

FIG. 1 shows an arrangement of an FLC panel and a driving system for driving the panel according to an embodiment of the present invention. Referring to FIG. 1, this embodiment comprises an active matrix-driven type FLC panel 1 having a TFT as an active element, an X driver 2 constituted by, e.g., a shift register and a holding circuit, a Y driver 3 constituted by, e.g., a shift register and a latch, a timing controller 4, a pole reverse circuit 5 for a video signal, a pole reverse circuit 6 for a reset signal, and a switching circuit 7 for the video and reset signals.

Figure 2A:
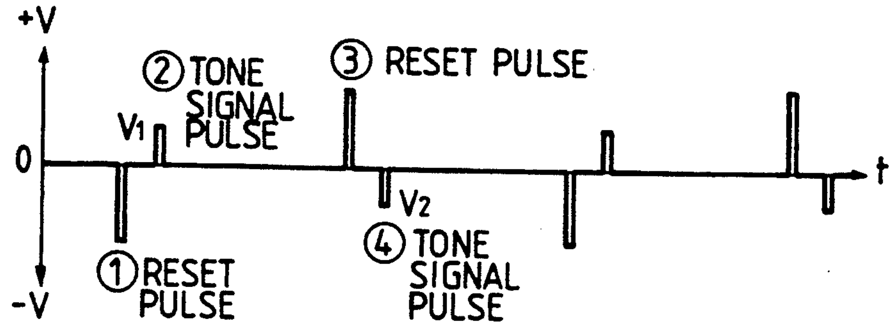
FIGS. 2A, 2B, and 2C are timing charts showing signal waveforms according to the driving method of the present invention.
Figure 2B:
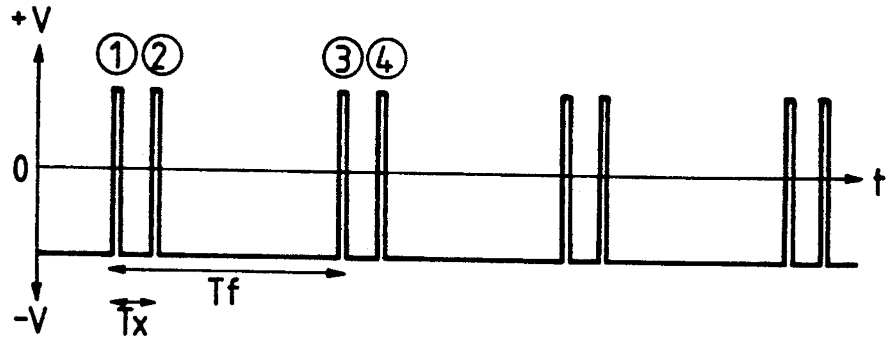

In this embodiment, a first gate pulse ① and a second gate pulse ② delayed slightly from the first gate pulse ① by a time (Td) as shown in FIG. 2B are generated by the timing controller and the Y driver and supplied to each gate line 9 at a sequential horizontal period. For one line or pixel, a frame period Tf is present before the next gate pulse, and pulses ③ and ④ shown in FIG. 2B correspond to this gate pulse. Operation timings of the pole reverse circuits 5 and 6 and the switching circuit 7 are controlled in synchronism with the timings of the gate pulses ①, ②, ③, ④, . . . such that an output to an input signal line 10 of the X driver becomes a negative reset voltage, a positive tone signal voltage, a positive reset voltage, a negative tone signal voltage, . . . (this sequence is similarly repeated in the subsequent operation). Therefore, a drive signal as shown in FIG. 2A is applied to a pixel of interest via the TFT. In addition, since the TFT is in an OFF state when no signal is applied thereto and the spontaneous polarization $P_S$ of the FLC has the charge canceling effect as described above, an interelectrode voltage waveform as shown in FIG. 2C is obtained in the pixel of interest as a capacitive load.

Figure 2C:
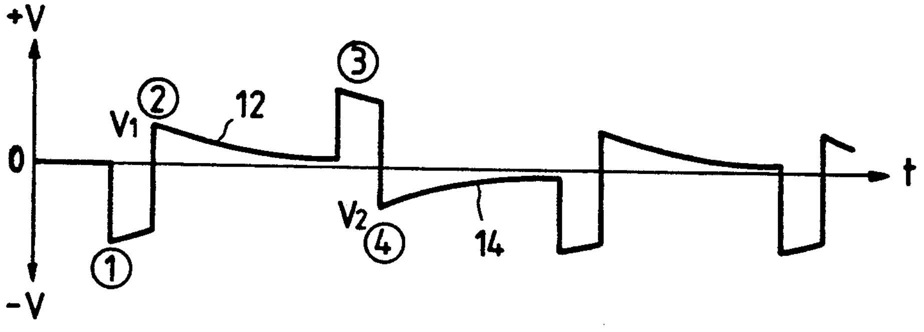
Figure 3A:
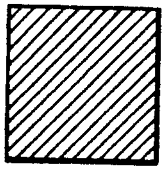
FIGS. 3A to 3D are views showing display states of predetermined pixels.
Figure 3B:
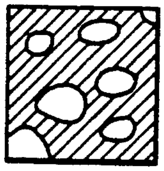

Referring to FIG. 2C, a timing ① corresponds to the negative reset, and all the FLCs in the pixel return to the first stable state at this timing. A total black state as shown in FIG. 3A is obtained within the time Td. Thereafter, upon application (②) of the positive tone signal, a charge Q ($=CV_1$, C: an interelectrode capacitance of a pixel and $V_1$: a tone signal voltage) is supplied to the pixel. In this case, as described above, an area (domain) corresponding to $a=Q/2P_S$ is reversed to white display (FIG. 3B). Since the charge Q is canceled by $P_S$ of the FLC, attenuation 12 (FIG. 2C) of the voltage occurs. This state continues for a time duration of Tf−Td (for Tf> >Td) to display a tone state. Assuming that a reverse ratio at this time is $T(V_1)$ [%], $T(V_1)=a/S$ (S: an area of the entire pixel) is satisfied, and this is substantially equal to the transmittance.

Figure 3C:
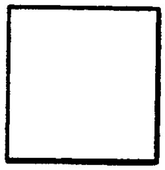
Figure 3D:
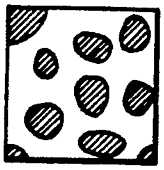

The state then transits to that indicated by ③ which corresponds to the positive reset. In this case, all the FLCs in the pixel change to the second stable state, and a total white state as shown in FIG. 3C is obtained. Upon application (④) of the negative tone signal, the electric charge Q ($=CV_2$) is supplied to the pixel, and an area (domain) corresponding to $a=Q/2P_2$ is reversed to a black display as shown in FIG. 3D. At this time, attenuation 14 occurs in voltage. Assuming that reverse ratio at this time is $a/S=T(V_2)$, the transmittance is $100-T(V_2)$. Therefore, a relationship between the signal voltage and the transmittance upon application of the positive tone signal becomes complementary with respect to that upon application of the negative tone signal. Therefore, the relationship between the positive tone signal $V_1$ and the negative tone signal $-V_2$ for obtaining a predetermined transmittance is given by $T(V_1)+T(V_2)=100$. The processes ①, ②, ③, and ④ are repeated to perform display on the FLC panel. Especially when the sum of the time Td required for the reset processes ① and ③ and the tone signal pulse application time is reduced below the horizontal scanning time, since the display states of the processes ② and ④ are maintained for a time duration corresponding to the frame period, almost no influence of the reset process appears in the total white or black display of the pixel.

Figure 6:
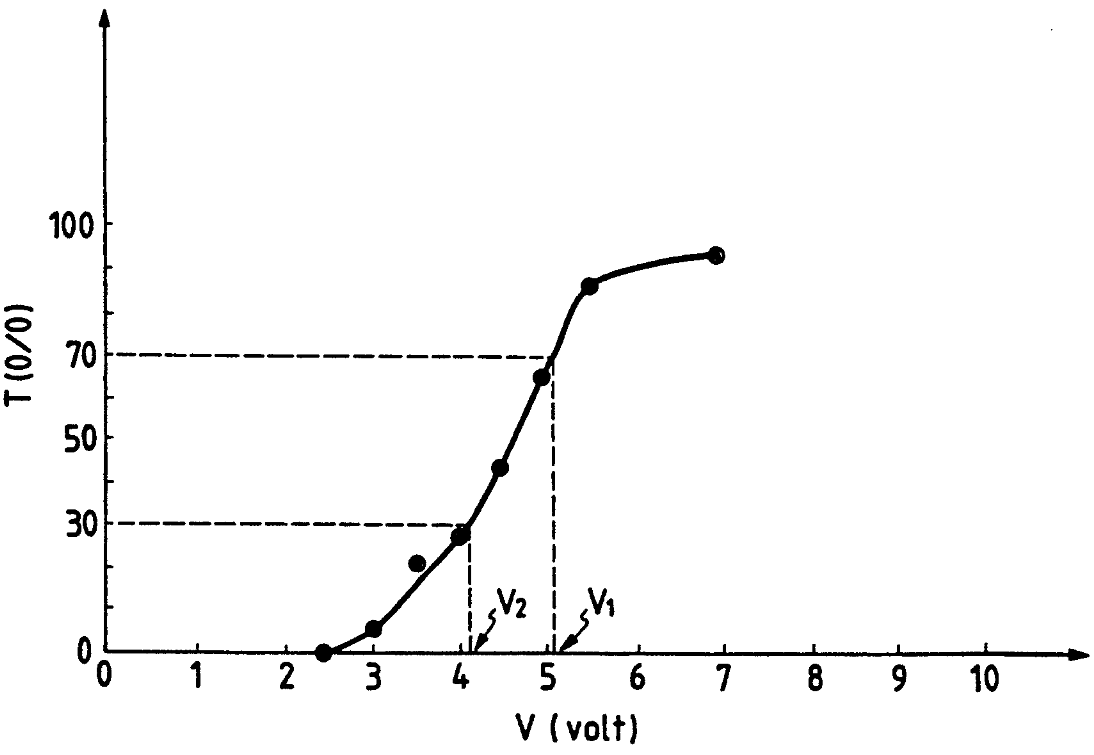
FIG. 6 is a graph showing a relationship between a tone signal voltage and transmittance.

Actually, the relationship between the tone signal voltage and the transmittance is not always linear but is non-linear, as shown in FIG. 6. FIG. 6 plots a reversed area ratio to the white state obtained when the voltage V (charge CV) is applied to a pixel in the black state. An area ratio obtained when the voltage −V is applied to a pixel in the white state to reverse the pixel into the black state is given by reversing the curve shown in FIG. 6 because the white state and the black state are symmetrical. In either case, the reversal is not linearly proportional to the application voltage. Although the reason for this result is unclear, it is presumed that the reversal of domain progresses little with respect to a weak electric field. However, even when the relationship of T(V) is not linear, the relation of $T(V_1)+T(V_2)=100$ is satisfied by selecting $V_1$ and $V_2$, as shown in FIG. 6. That is, to display a halftone level of 70%, for example, a voltage of black-reset/white-write is set at the voltage $V_1$ for giving $T_1=70\%$ shown in FIG. 6, and a voltage of white-reset/black-write on the opposite side is set at the voltage $V_2$ (of a negative pole) for giving $T_2=30\%$. Therefore, it is obvious that the method of the present invention can be applied to arbitrary reversal characteristics T(V).

In addition, when the driving is executed by using the horizontal scanning period as the reversal period of the positive and negative poles of the resetting and the tone signal and setting opposite poles in reset voltages of neighboring scanning lines, the total white and total black displays upon resetting are averaged to make flickering or the like more inconspicuous.

When the above driving method is adopted, the DC electric field applied on the FLC layer is not shifted to positive or negative but averaged, as shown in FIG. 2C. Therefore, adhesion of impurity ions and degradation in a liquid crystal material can be prevented to realize a stable display throughout a long operation period.

In the above writing system, each pulse width and the level of the reset pulses ① and ③ shown in FIG. 2A were set at 5 μs and 7 V, respectively, Tα and Tf shown in FIG. 2B were set at 200 μs and 33 ms, respectively, and the level of the tone signal pulse was selected in accordance with the characteristic curve shown in FIG. 6. As a result, a halftone level substantially from 0% to 100% was able to be stably displayed.

Embodiment 2

Figure 7:
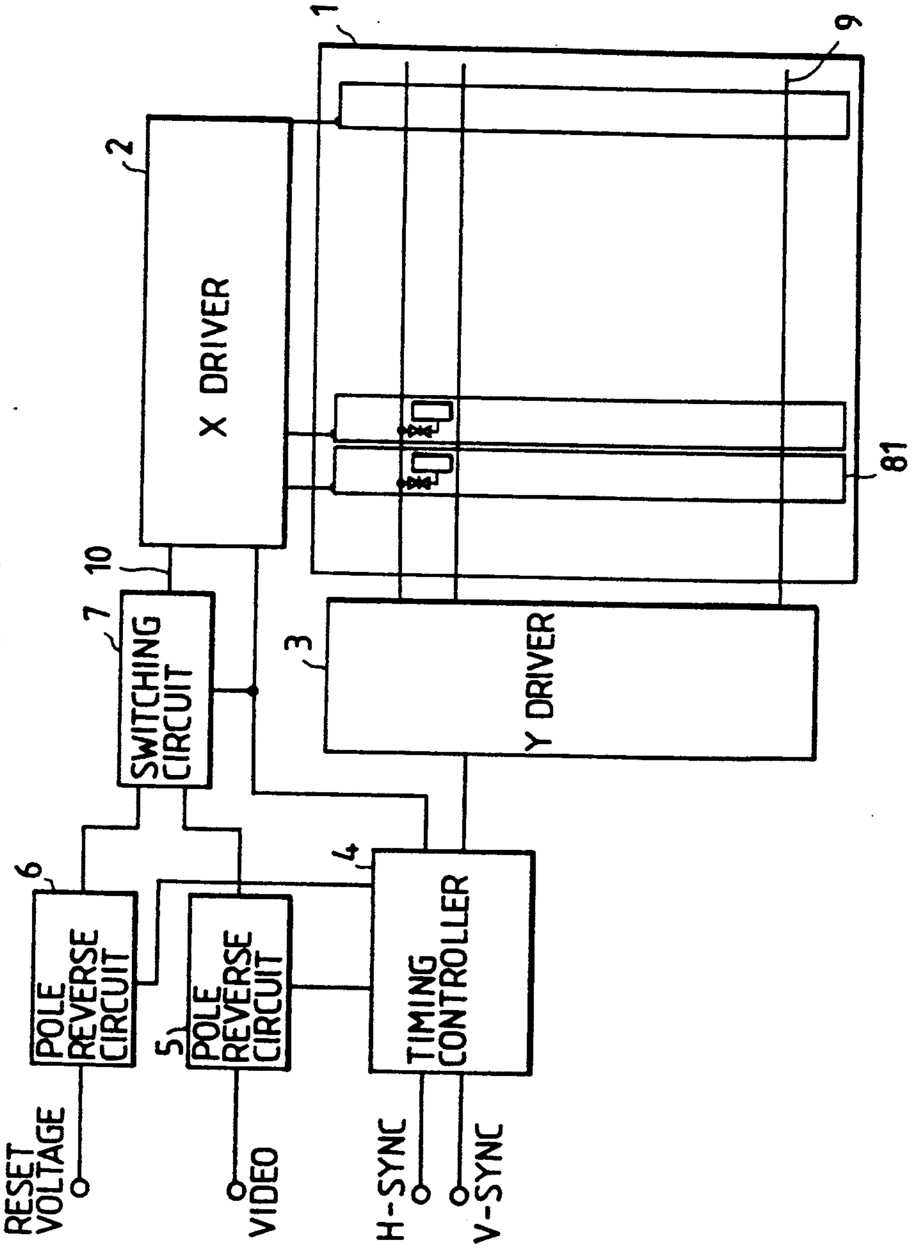
FIG. 7 is a block diagram showing an FLC panel and a driving system according to another embodiment of the present invention.
Figure 8A:
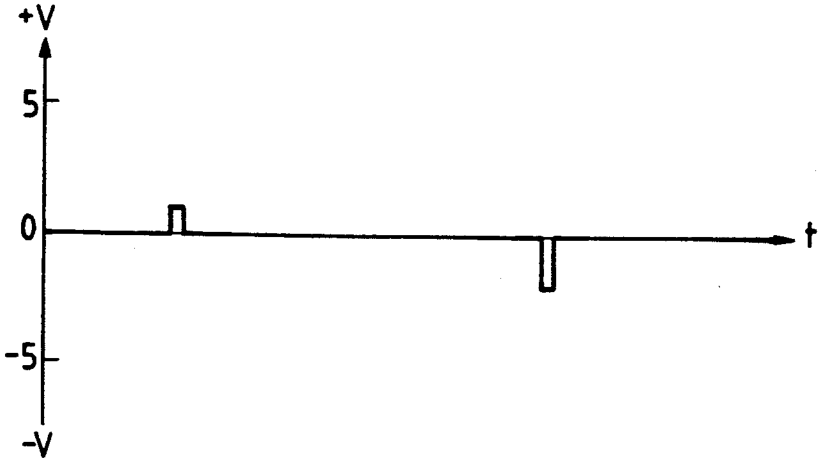
FIGS. 8A, 8B, and 8C are timing charts showing signal waveforms in the driving method according to another embodiment of the present invention.
Figure 8B:
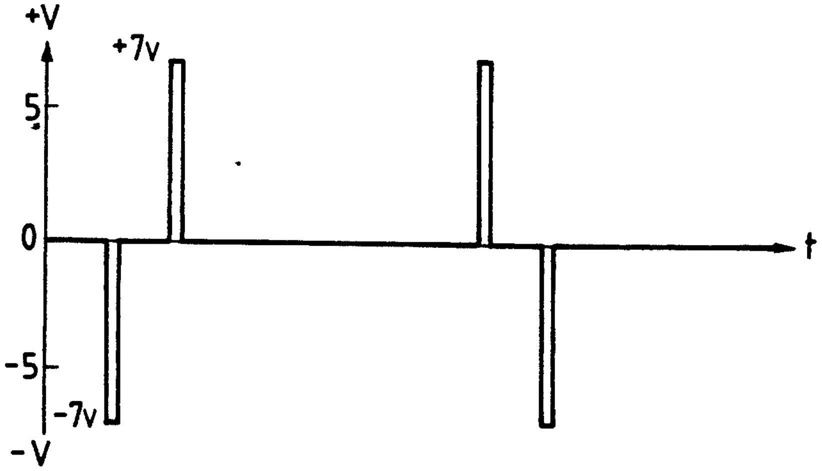
Figure 8C:
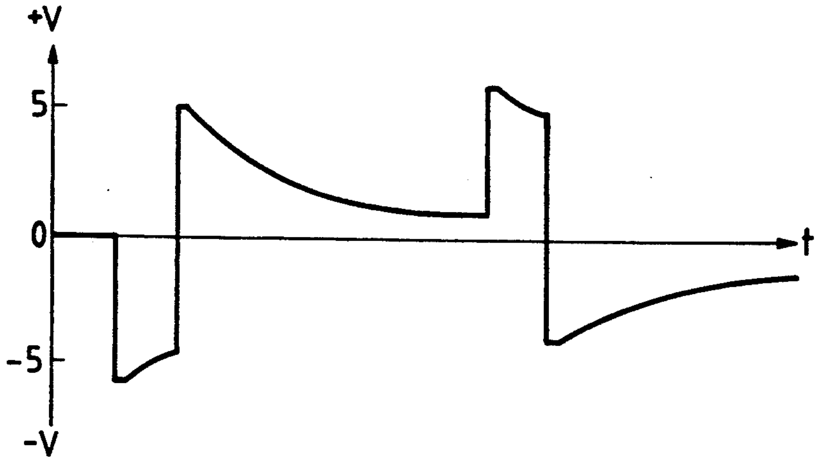

FIG. 7 shows another embodiment of the present invention using a two-terminal switching element unlike in the embodiment shown in FIG. 1. Although an MIM element, a diode, and a combination of a plurality of MIM elements and diodes may be used as the switching element, this embodiment will be described below by taking an MIM as an example. One terminal of the MIM is connected to a pixel electrode, its other terminal is connected to a scanning signal line, and a stripe-like information signal electrode 81 is patterned on a counter substrate. The MIM used in this embodiment has a structure in which a thin film consisting of tantalum pentoxide is sandwiched by tantalum and has a threshold value of about 1 V. FIGS. 8A, 8B, and 8C show timings of drive signals used in this embodiment, in which FIG. 8A shows a voltage to be applied to the information signal electrode, FIG. 8B shows a voltage to be applied to the scanning signal line, and FIG. 8C shows a voltage waveform appearing across the two ends of a pixel. A negative voltage of −7 V is applied to the scanning line and 0 V is applied to the information electrode upon resetting indicated by ①. A positive selection voltage of +7 V is applied to the scanning line and a voltage of 0 V to +7 V is applied to the information electrode in accordance with a tone level upon writing indicated by ②. In opposite periods ③ and ④, pulses having poles opposite to those applied in the periods ① and ② are applied. Note that as in Embodiment 1, the tone signal level not only has the pole opposite to that applied in the period ② but also generally has a different amplitude, i.e., is so selected as to satisfy $T(V_1)+T(V_2)=100\%$.

Comparative Example 1

Figure 4A:
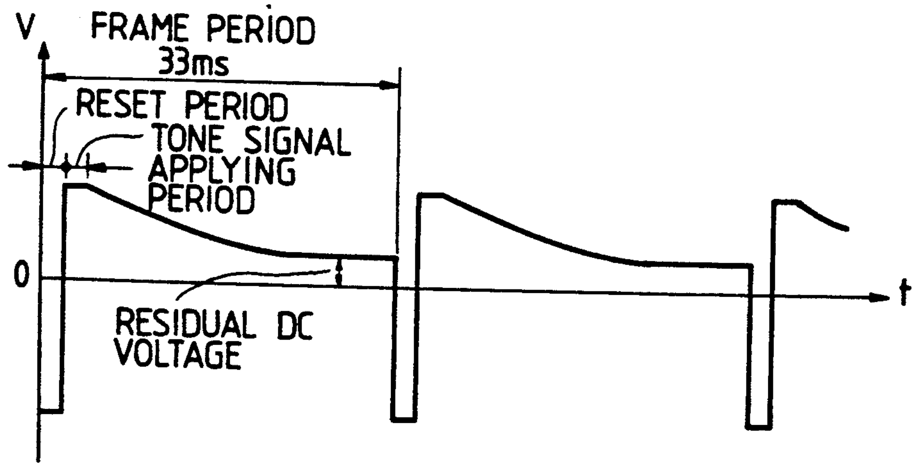
FIGS. 4A and 4B are timing charts showing characteristics obtained by an area tone method according to charge modulation.
Figure 4B:
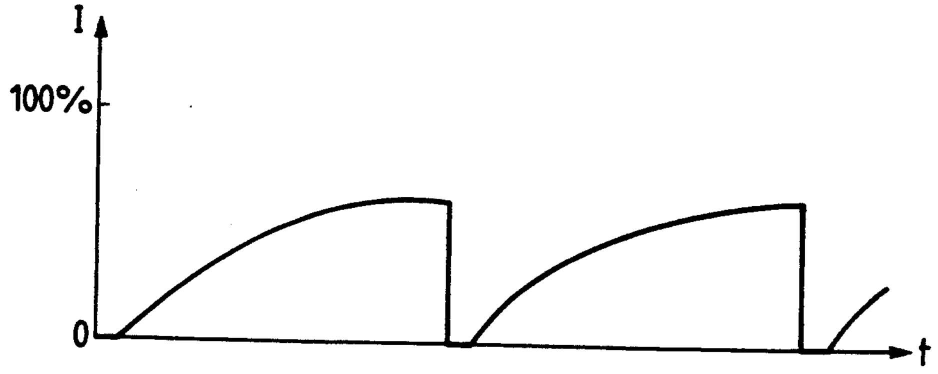
Figure 5:
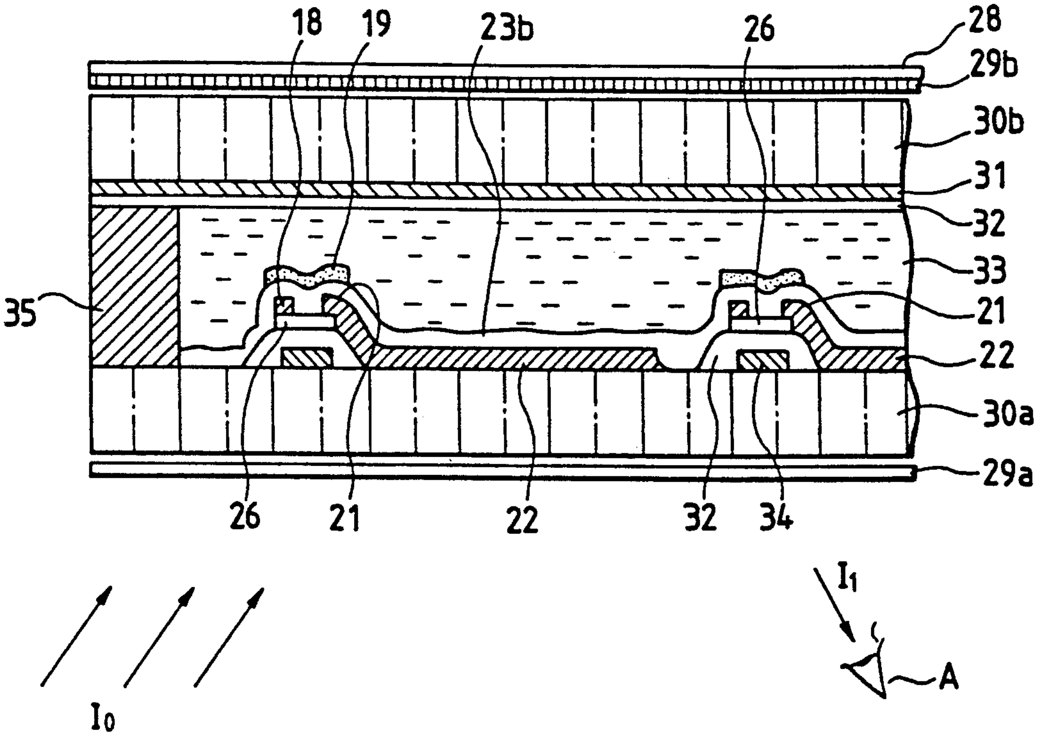
FIG. 5 is a sectional view showing a layer arrangement of an FLC element.

When driving was executed by the resetting system using one pole shown in FIGS. 4A and 4B, display disappeared in two to three seconds. At this time, a pulse width and a frame period were the same as those in Embodiment 1. The display disappeared because ions were moved in a liquid crystal due to a residual DC voltage to form an internal electric field at the opposite side of a write electric field, thereby reducing the effective write electric field.

Comparative Example 2

The same drive waveforms as in Embodiment 1 shown in FIGS. 2A to 2C were used, and a write voltage was set such that a positive reverse ratio $T(V_1)$ was 70% and a negative reverse ratio $T(V_2)$ was 25%. As a result, flickering became conspicuous and display quality was degraded. Flickering was found even when the positive reverse ratio $T(V_1)$ was set at 70% and the negative reverse ratio $T(V_2)$ was set at 35%.

As has been described above, by reversing the poles of the reset voltage and the tone signal every predetermined period, degradation in liquid crystal material and reduction in bistability of the FLC caused impurity ions can be prevented.

In addition, by executing driving by using the horizontal period as the pole reverse period and setting opposite poles in reset voltages of neighboring scanning lines, flickering and the like can be prevented.

What is claimed is:

1. A method of driving a liquid crystal display element in which a switching element is provided for each of pixel electrodes arranged in a matrix manner and a ferroelectric liquid crystal is sandwiched between said pixel electrodes and a counter electrode, wherein the method displays a gradational picture on the display element through one cycle scanning and comprises the steps of:

applying a reset voltage for resetting the entire pixel to a first stable state of said ferroelectric liquid crystal across said pixel electrode and said counter electrode;

partially transiting said pixel to a second stable state by a tone signal voltage having an opposite polarity to that of the reset voltage; and reversing the polarity of the reset voltage every predetermined period, wherein if a state reverse ratio of said ferroelectric liquid crystal is indicated as T(V) when the tone signal voltage is V, a tone signal voltage $V_1$ after negative resetting and a corresponding tone signal voltage $-V_2$ after positive resetting satisfy the following relation:

$$T(V_1)+T(V_2)=100.$$

2. A method according to claim 1, wherein the predetermined period is a scanning period of one frame.

3. A method according to claim 1, wherein reset voltages of neighboring scanning lines have opposite poles.

4. A method according to claim 1, wherein said first stable state corresponds to a black status.

5. A ferroelectric liquid crystal device for displaying a gradational image picture and having a switching element provided for each of pixel electrodes arranged in a matrix array and ferroelectric liquid crystal interposed between opposite electrodes, comprising:

means for alternately applying a reset voltage and a tone signal voltage to the opposite electrodes, the reset voltage being a voltage of resetting the whole pixels into a first stable state and the tone signal voltage being a voltage in an opposite polarity to the reset voltage and transitting part of the pixels into a second stable state;

means for reversing the polarity of the reset voltage at every predetermined period; and means for reversing the polarity of the tone signal voltage at every predetermined period, and wherein if a state reverse ratio of said ferroelectric liquid crystal is indicated as T(V) when the tone signal voltage is V, a tone signal voltage $V_1$ after negative resetting and a corresponding tone signal voltage $-V_2$ after positive resetting satisfy the following relation:

$$T(V_1)+T(V_2)=100.$$

6. A ferroelectric liquid crystal device according to claim 5, wherein the predetermined period is a scanning period of one frame.

7. A ferroelectric liquid crystal device according to claim 5, wherein reset voltages of neighboring scanning lines have opposite poles.

8. A ferroelectric liquid crystal device according to claim 5, wherein said first stable state corresponds to a black status.

* * * * *

UNITED STATES PATENT AND TRADEMARK OFFICE
CERTIFICATE OF CORRECTION

PATENT NO. : 5,227,900

DATED : July 13, 1993

INVENTOR(S) : YUTAKA INABA, ET AL.

It is certified that error appears in the above-identified patent and that said Letters Patent is hereby corrected as shown below: Title page, item [30] FOREIGN APPLICATION PRIORITY DATA Insert: --March 15, 1991 [JP] Japan .... 3-074205--.

COLUMN 3

Line 45, "according" should read --according to--.

COLUMN 4

Line 41, "predetermine" should read --predetermined--.

COLUMN 6

Line 40, "that" should read --that a--.

Signed and Sealed this

Fifth Day of April, 1994

Attest:

BRUCE LEHMAN

Attesting Officer

Commissioner of Patents and Trademarks